May 15, 1945. J. E. BROYLES 2,375,748
TRANSMISSION MECHANISM FOR RECIPROCATING ENGINES
Filed June 5, 1943 3 Sheets-Sheet 1
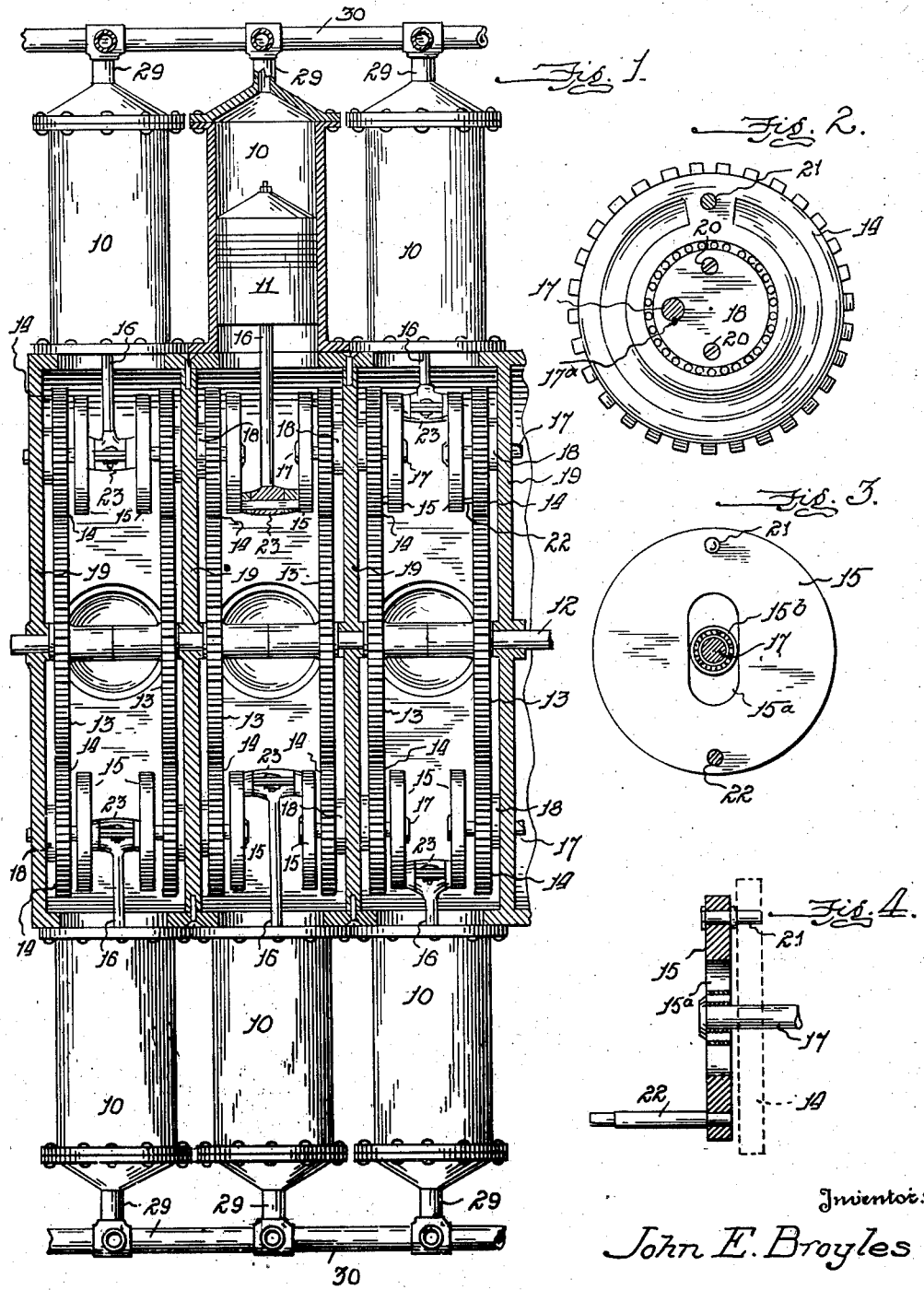
Inventor:-
John E. Broyles May 15, 1945. J. E. BROYLES 2,375,748
TRANSMISSION MECHANISM FOR RECIPROCATING ENGINES
Filed June 5, 1943 3 Sheets-Sheet 2
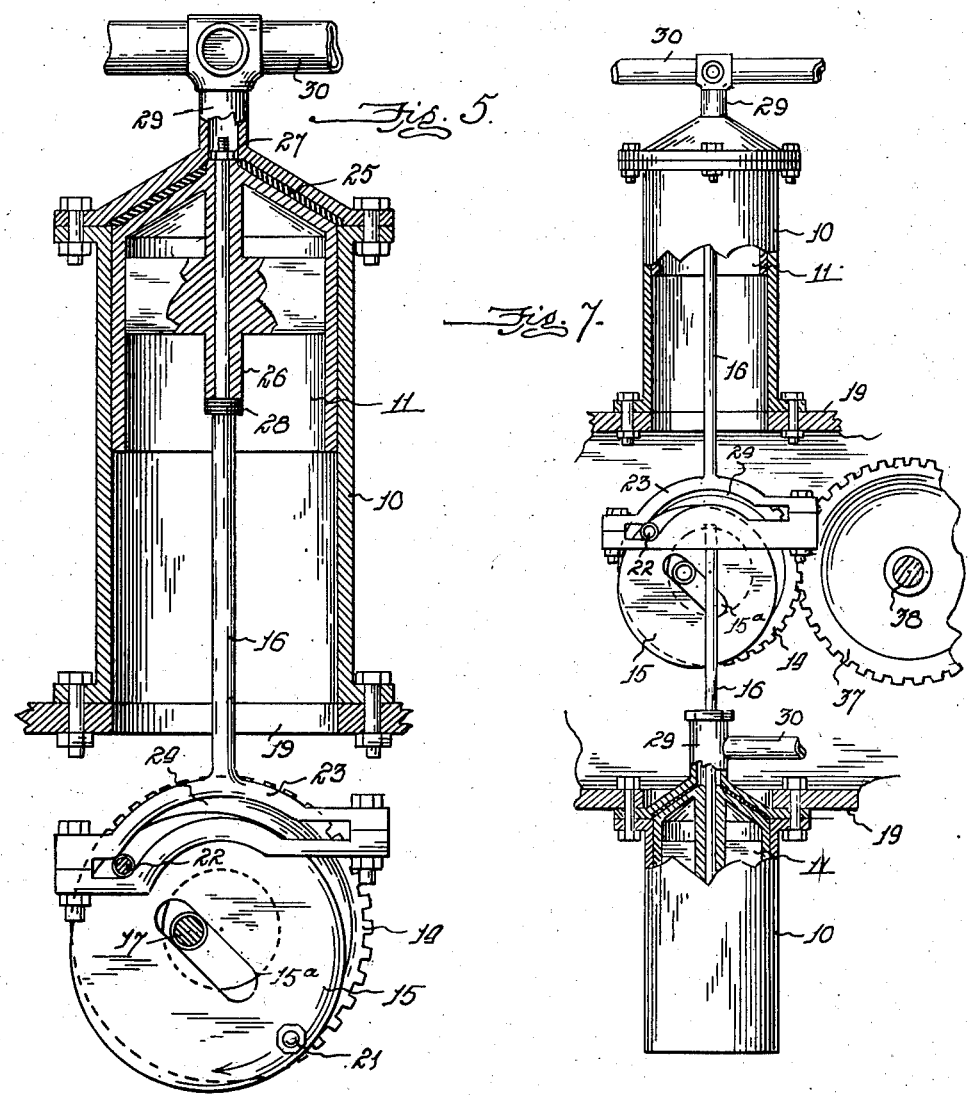
Inventor
John E. Broyles.

May 15, 1945. J. E. BROYLES 2,375,748
TRANSMISSION MECHANISM FOR RECIPROCATING ENGINES
Filed June 5, 1943 3 Sheets-Sheet 3

Inventor:-
John E. Broyles.

By -
Attorney

Patented May 15, 1945

2,375,748

UNITED STATES PATENT OFFICE 2,375,748

TRANSMISSION MECHANISM FOR RECIPROCATING ENGINES

John E. Broyles, Washington, D. C.

Application June 5, 1943, Serial No. 489,827

9 Claims. (Cl. 74—50)

My invention relates to reciprocating engines, with particular reference to the mechanism by which the power imparted to the piston is transmitted to the shaft forming a part of the engine assembly.

In the construction of the usual type of reciprocating engines the power is applied to the crankshaft on the outstroke of the piston, and although it has been proposed to provide a crankshaft assembly which contemplates increasing the leverage of the piston-rod on the power stroke of the piston the purpose of my invention is to accomplish the desired result in a manner that will bring about greater efficiency.

The principal object of my invention, therefore, is to provide an improved form of transmission between the reciprocating piston and driven shaft to include elements of construction cooperating in such manner that in the operation of the piston and connecting rod I not only transmit greater leverage on the power stroke—as produced by the ordinary reciprocating engine—but include an intermediate neutral zone of travel of the piston and piston-rod to reduce resistance for a more effective application of power to the driven shaft, and to incorporate a motive force or power pressure element the engine cylinders are connected to an air-pressure supply whereby pulsations are applied on the power strokes—at the most advantageous stage of the turning movement of the controlling factor of the transmission—and relieved during the return stroke or least advantageous stage, with pressure practically eliminated during travel through the neutral zone.

In the present form of my invention the piston-rod has a direct longitudinal movement and is provided with means for connecting it to the contiguous controlling elements or lever-wheels of the transmission mechanism to provide for movement of said controlling elements in a comparatively short arc while the piston and connecting rod remain idle during such movement or until the rotation of the lever-wheels arrive at a point where the power stroke of the piston—in respect to each cylinder of a multiple-cylinder engine—will be applied thereto in the most effective manner.

In the drawings:

Fig. 1 is a vertical transverse sectional view through an engine constructed in accordance with my invention, to illustrate the transmission mechanism between the reciprocating pistons and driven shaft operated thereby.

Fig. 2 is a detail view of one of the gearwheels forming a part of the transmission mechanism.

Figs. 3 and 4 are detail views of the power controlling element or lever-wheel associated with the companion gearwheel.

Fig. 5 is an enlarged view, in section, of one of the cylinders and associated parts of the transmission mechanism—the section being taken at right angles to Fig. 1.

Fig. 6 is a detail view illustrating a modification in the construction of the crosshead at the outer end of the piston-rod.

Fig. 7 shows a modification contemplating the connection of piston-rods of opposite cylinders to a transmission assembly common to both.

Figure 8:
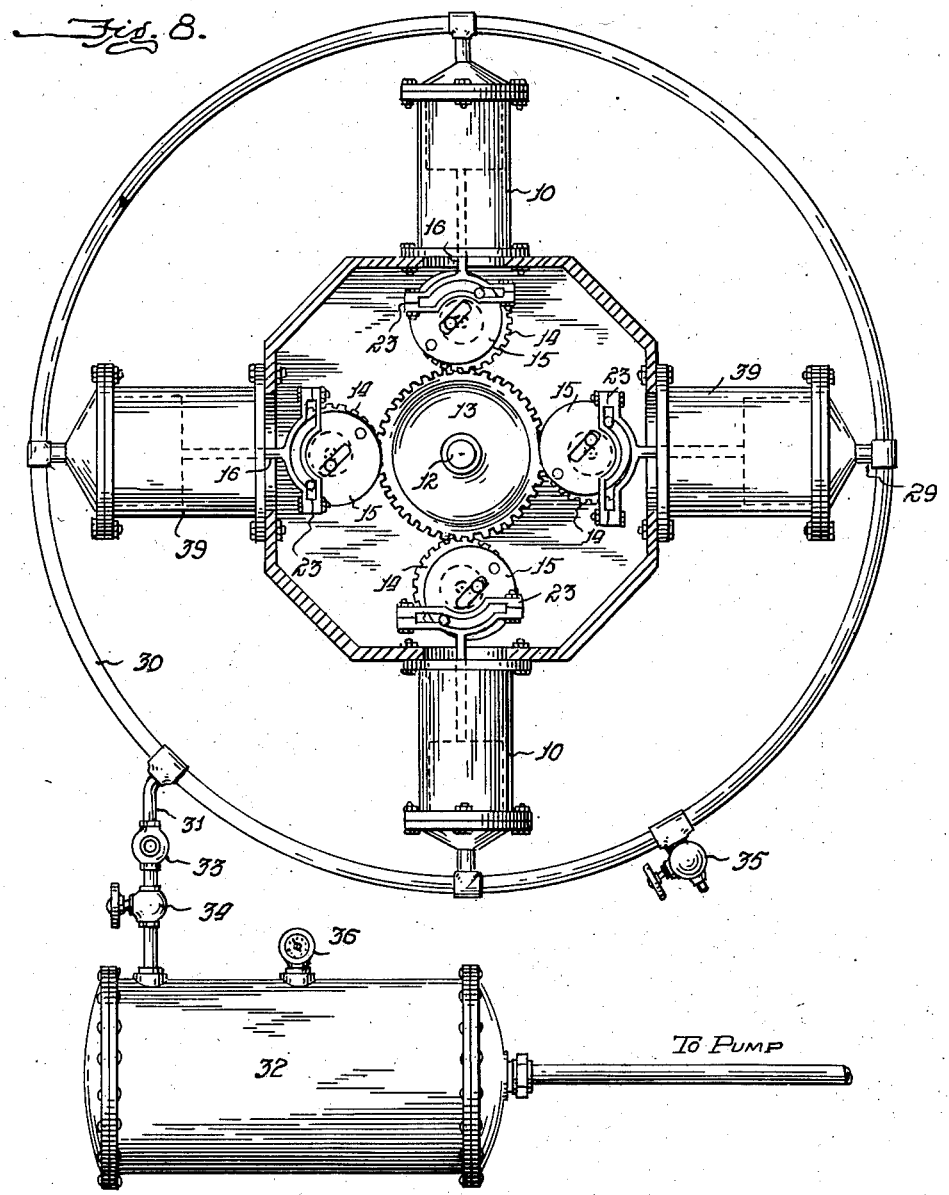
Fig. 8 shows an arrangement for application of fluid pressure to the several cylinders of a multiple-cylinder engine provided with my improved transmission mechanism.

My improved form of transmission mechanism is usable in connection with a reciprocating engine in which the piston-rod is rigidly connected to the piston for direct longitudinal movement thereof, and although I have illustrated its application to an air-pressure engine it will be understood that any other fluid pressure may be employed with the arrangement shown and described, and that said arrangement is applicable to other sources of motive power that may be applied to the lever-wheels. Furthermore, as the transmission mechanism is more effective in a multiple-cylinder engine I have shown several units each having four cylinders disposed around a shaft common to all, whereby the rotation of the pistons may be timed to operate successively so that the operation of one will assist the operation of another. Accordingly a description of one of the engine cylinders and cooperating transmission mechanism related to the reciprocating piston will apply to the others, like numerals of reference being used to designate like parts in the several views of the drawings.

In carrying out my invention each engine cylinder 10 contains a reciprocating piston 11 to which piston-rod 16 is rigidly connected in the manner hereinafter set forth, and for the purpose of equalizing the strokes of the pistons—in a multiple-cylinder engine—the cylinders are arranged around a driven shaft 12 having a large gearwheel 13 with interposed smaller gearwheels 14 turned by companion lever-wheels 15 to which the piston-rod is connected; it being noted that each circular series of cylinders and cooperating transmission mechanism forms a unitary structure that can be duplicated to increase the power applied to the shaft common to all. Likewise the number of cylinders of each unit may be increased, it being preferable to have them arranged in pairs with a cylinder of each pair opposing the other cylinder.

Each transmission mechanism operated by a piston and connecting rod comprises a pair of lever-wheels 15, 15, at opposite sides of the outer end of the connecting rod or piston rod each connected to one of the gearwheels, 14, with a stationary shaft 17 passing through the companion wheels, said shaft being keyed, as at 17a, to a large bearing 18—around which the gearwheel revolves—fastened to the adjoining side wall 19 of the casing by screws 20. As will be noted by reference to Fig. 2 the large bearing forms a support for the stationary shaft to locate it at one side of the center or axis of the gearwheel, and this shaft serves as a fulcrum for the lever-wheel which revolves around the same after the manner of an eccentric with a variable center point or axis permitting it to perform the duty of a lever having a changeable fulcrum and be designated or termed a "lever-wheel." For the accomplishment of this movement of the lever-wheel it is connected by pin 21 to the gearwheel near the periphery thereof, whereby the axis or center of said lever-wheel changes during the rotation of the latter while the center or axis of the gearwheel—defined by the large concentric bearing, 18, secured to the casing—remains fixed. The shifting movement of the lever-wheel during rotation of the companion gearwheel is provided for by a slot 15a in said wheel and through which the shaft—forming the fulcrum—passes. To reduce friction between the stationary shaft and side walls of the slot in the lever-wheel a ball bearing ring is interposed, and for a like purpose ball bearings are interposed between the gearwheel and concentric bearing on which it revolves. Fulcrum-shaft 17—at either side of the path of movement of the piston-rod—is extended through the large bearing 18, adjoining wall of the casing and bearing 18 of the adjoining engine so as to cooperate therewith in respect to the timing of the transmission mechanisms of a multiple cylinder engine, and of course the gearwheels 14 of the engines adjoining each other, as well as those of the others, are set for the desired timing.

In the operation of the lever-wheel as shown in the drawings the piston-rod is connected thereto by pin 22—located diametrically opposite pin 21—and for the purpose of providing the neutral zone of travel of the piston-rod a crosshead 23, of a particular construction is at the outer end thereof, said crosshead being in the form of a yoke disposed transversely and having an arcuate slot 24 corresponding to the travel of the connecting pin—in one form of the slot (Fig. 5) the arc is less than 90° while in the other form (Fig. 6) it extends the full 90°—and in each instance the disposition of the piston and its connecting rod is such that the connecting pin will travel in the arcuate slot at the end of the inward stroke of the piston—in both instances, however, the arc terminating at the arrival of the pin at approximately the beginning of the power stroke. Movement of the pin beyond the arcuate slot—in both directions—is provided for by extensions of the slot, as shown in the drawings. Now to compensate for the slight movement of the piston during travel of the pin in the arc—permitted by slight movement of the lever-wheel on the fulcrum-shaft—a cushion 25, of rubber or other resilient material, is attached either to the inner end of the piston or underside of the cylinder-head, and to provide for adjusting the piston with respect to the cooperative action of the lever-wheels the rigid connection of the piston-rod to the piston is made by reducing the upper portion of the rod—where it passes through the core 26 of the piston—and threading a nut 27 on the upper extended end thereof, so that shims 28 may be inserted between the lower end of the core and shoulder on the piston-rod.

For the operation of the pistons I may employ fluid pressure, as compressed air, from a storage tank, and for this purpose short pipes 29 connecting each cylinder with a supply pipe manifold 30 connected by pipe 31 to the storage tank 32, with the latter connected by pipe to a pump or compressor (not shown). The pipe 31 which connects the manifold to the air pressure tank is provided with a check valve 33 and cut-off valve 34, while the manifold has a cut off valve 35 and the tank a pressure gauge 36. In operation the check valve 33 maintains increased air pressure in the manifold on the compression stroke of the pistons so that the confined air pressure will be applied on the power stroke of said pistons, and of course this check valve will permit any required introduction of air at the end of the power stroke. On the other hand, cutting off the air pressure supply by means of the valves 34 and 35 will stop the engine. Accordingly the operation of the transmission mechanism in connection with the reciprocating pistons will be readily understood, for the direct reciprocation of the piston rods longitudinally will be applied to the companion lever-wheels—turning clockwise—in such manner that when the connecting pin 22 arrives at approximately 45° beyond top center the power stroke begins and continues to approximately the bottom center, where the return stroke begins, and on arrival at approximately 45° from the top center said connecting pin travels in the arcuate slot in the yoke, during which time of travel in the yoke there is practically no movement of the piston until it again begins the power stroke—it being understood that while one piston is travelling on the return stroke one or more of the other pistons will be on the power stroke—determined by the connection of the gearwheels 14 to the gearwheel 13 on the shaft driven by the engine.

In Fig. 7 of the drawings I have shown a modification in the connection of the piston-rods to the transmission mechanism, which contemplates connection of opposite pistons to a single transmission mechanism of the same construction hereinbefore described, like numerals of reference being used to designate like parts; though in this instance the gearwheels 14 are connected to gearwheels 37 on driven shaft 38 at one side of the same, and of course this modified construction will be employed when it is desired to arrange the cylinders in horizontal series instead of around the driven shaft—the piston-rods of the opposing pistons being connected to the same yoke.

As a further modification I contemplate the employment of larger cylinders, 29, to alternate with smaller cylinders 10, as shown in Fig. 8 of the drawings, the use of the larger cylinders being to take advantage of lowered fluid-pressure after being decreased by the power strokes of the pistons in cylinders 10—the operation of the pistons in the larger cylinders being timed to begin the power strokes at approximately 90° behind the power strokes of the pistons in the smaller cylinders, as indicated by the locations of the connecting pins 22 in the yokes 23 in this modification.

It will be obvious that in the several adaptations of my improved form of transmission mechanism pressure is relieved from the lever-wheel or lever-wheels when excessive energy or air power may be lost due to the diametrical thrust permitted by the slot in the lever-wheel while the connecting pin travels in the arcuate slot in the yoke at the end of the piston-rod; that is to say, when the connecting pin is travelling in the arcuate slot the action of the fluid pressure is negligible due to the piston being closed against the cylinder-head or interposed cushion.

I claim:

1. Mechanism for transmitting power from a motive source to a shaft for the utilization of the power, said mechanism comprising a lever-wheel having a diametrical slot at one side of the axis thereof, a fulcrum passing through the slot so that said lever-wheel may have a rotatable and lateral movement thereon, a wheel connected to the lever-wheel and rotatable on a large bearing from which the fulcrum of the lever-wheel projects at one side of the center of the bearing and axis of the wheel rotatable thereon, and means connected to the lever-wheel for imparting rotary motion thereto, said connection being at the opposite side of the axis of the lever-wheel from the connection of the latter to its companion wheel.

2. Mechanism for transmitting power from a motive force to a shaft for utilizing the power, said mechanism comprising a lever-wheel having a slot by which it may have a rotatable and lateral movement on a fulcrum passing through the slot, a gear-wheel connected to the lever-wheel and geared to the shaft to be driven by the motive force—the connection between the lever-wheel and companion gearwheel being near the periphery of the latter, and a large bearing on which said companion gearwheel is rotatable and from which the fulcrum of the lever-wheel projects at one side of the center of the bearing and axis of the gearwheel; together with a connection between the motive force and lever-wheel including an arcuate slot in the connection to provide a neutral zone of travel between said connection and lever-wheel.

3. An engine including a plurality of cylinders arranged around a shaft—each cylinder including a reciprocating piston and piston rod, of transmission mechanism for applying the power of the pistons to the shaft, said mechanism comprising a lever-wheel having a slot by which it may have rotatable and lateral movement on a fulcrum located in the slot, a gearwheel connected to the lever wheel near the periphery of said gearwheel and geared to the shaft, and a large bearing on which the gearwheel connected to the lever-wheel is rotatable and from which the fulcrum of the lever-wheel projects at one side of the center of the bearing and axis of the gearwheel rotatable thereon; together with a connection between the piston rod and lever-wheel including an arcuate slot in the connection to provide a neutral zone of travel between said connection and lever-wheel.

4. An engine including a plurality of cylinders arranged around a shaft, in accordance with claim 3, and characterized by having the piston rod rigidly connected to the piston for direct longitudinal movement, and including means for adjusting the piston rod longitudinally with respect to the piston.

5. An engine including a plurality of cylinders arranged around a shaft for the operation of the latter, in accordance with claim 3, and characterized by having the piston rod rigidly connected to the piston for direct longitudinal movement, and a resilient cushion between the piston and cylinder-head.

6. An engine including a plurality of cylinders arranged around a shaft for the operation of the latter, in accordance with claim 3, and characterized by having cylinders of variable sizes.

7. An engine including a plurality of cylinders arranged around a shaft for the operation of the latter, in accordance with claim 3, and characterized by having cylinders of variable sizes, and a resilient cushion between the piston and cylinder head.

8. An engine including opposite cylinders—each having a reciprocating piston and connecting rod or piston rod, of transmission mechanism interposed between the cylinders and comprising a lever-wheel having a slot by which it may have rotatable and lateral movement on a fulcrum located in the slot, a gearwheel connected to the lever-wheel near the periphery of said gearwheel, and a large bearing on which the gearwheel connected to the lever-wheel is rotatable and from which the fulcrum of the lever-wheel projects at one side of the center of the bearing and axis of the gearwheel rotatable thereon; together with a yoke to which the aforementioned piston rods are connected, said yoke forming the connection between the piston rods and lever-wheel and having an arcuate slot included in the connection and into which a connecting pin passes to provide a neutral zone of travel in respect to the connecting pin.

9. A power transmission mechanism comprising a plurality of cylinders with their pistons and connecting rods, spaced apart diametrically slotted lever-wheels associated with each piston rod and to which the latter is connected near the periphery of the lever-wheel—the diametrical slot in each lever-wheel being adjacent the center of said wheel, a gearwheel connected to each lever-wheel diametrically opposite the connection of the latter to the piston rod, and a fulcrum shaft for each lever-wheel extending from the bearing of the companion gearwheel at one side of the axis of the gearwheel, the fulcrum shaft passing through the slot in the lever-wheel; whereby the power of the pistons applied to the lever-wheels will produce maximum leverage on the outstroke of the pistons; together with an auxiliary shaft, and gearwheels thereon in mesh with the gearwheels connected to the lever-wheels—the gearing being such that the force applied to the several lever-wheels is timed to alternate one with respect to another to assist the return strokes of the pistons.

JOHN E. BROYLES.